United States Patent [19]

Grover et al.

[11] Patent Number: 4,525,064
[45] Date of Patent: Jun. 25, 1985

[54] COPIER APPARATUS

[75] Inventors: William E. Grover, 2407 Wapiti Rd., Ft. Collins, Colo. 80525; Anthony R. Bruce, Berthoud, Colo.

[73] Assignee: William E. Grover, Fort Collins, Colo.

[21] Appl. No.: 397,101

[22] Filed: Jul. 12, 1982

[51] Int. Cl.³ .............................................. G03B 27/62
[52] U.S. Cl. ........................................ 355/75; 271/4; 271/3.1
[58] Field of Search ...................... 355/75, 64, 50, 40, 355/6, 8, 79; 271/4, 3.1; 354/292

[56] References Cited

U.S. PATENT DOCUMENTS

| | | | |
|---|---|---|---|
| 3,212,774 | 10/1965 | Ingalls | 271/68 |
| 3,499,710 | 3/1970 | Sahley | 355/6 |
| 3,642,370 | 2/1972 | Meredith et al. | 355/75 |
| 3,661,453 | 5/1972 | McGuire et al. | 355/3 |
| 3,682,075 | 8/1972 | Profitt | 355/125 X |
| 3,692,304 | 9/1972 | de Ridder | 271/75 |
| 3,775,007 | 11/1973 | Davidson | 355/40 X |
| 3,913,118 | 10/1975 | Abrams | 354/292 |
| 3,947,118 | 3/1976 | Amort | 355/77 |
| 3,993,300 | 11/1976 | Dehner | 355/75 X |
| 4,009,954 | 3/1977 | Ritzerfeld | 355/40 X |
| 4,039,180 | 9/1977 | Stocker | 271/10 |
| 4,050,800 | 9/1977 | Ogawa et al. | 355/75 |
| 4,056,321 | 11/1977 | Gensike et al. | 355/99 |
| 4,067,568 | 1/1978 | Irvine | 271/176 |

Primary Examiner—L. T. Hix
Assistant Examiner—Della J. Rutledge
Attorney, Agent, or Firm—Hugh H. Drake

[57] ABSTRACT

Copier apparatus is for use with a machine that prepares a copy from an original or master placed atop a surface through which the master is exposed. Defined in the master is a window through which a card placed over the window is exposed along with other matter carried upon the surface of the master. An assembly disposed above the master includes means for accepting a stack of cards which individually carry respective different notations to be exposed through the window. Handling means within the assembly places successive different ones of the cards in a position over the window and correspondingly moves successive ones of those cards from that position into a storage location.

23 Claims, 8 Drawing Figures

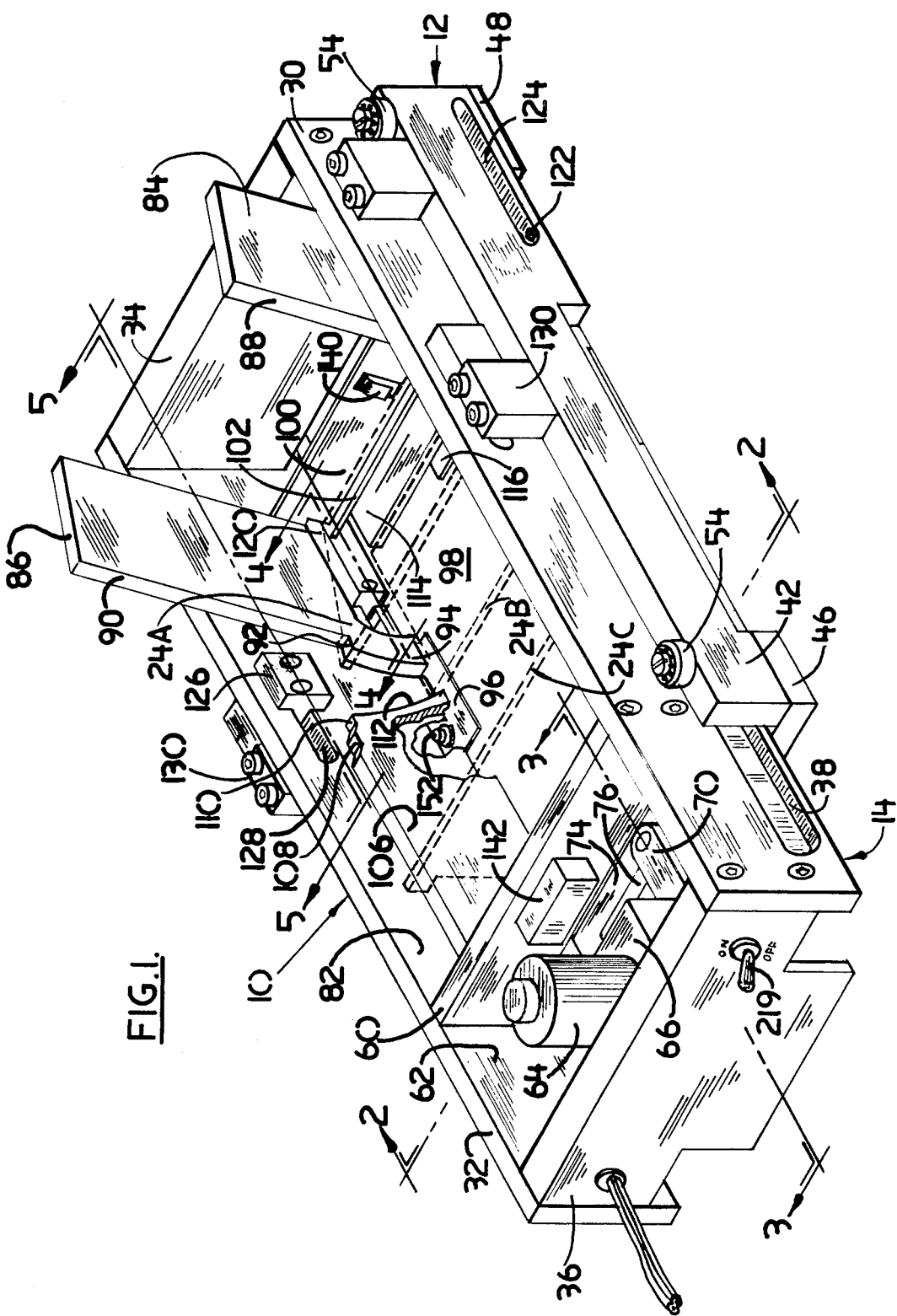

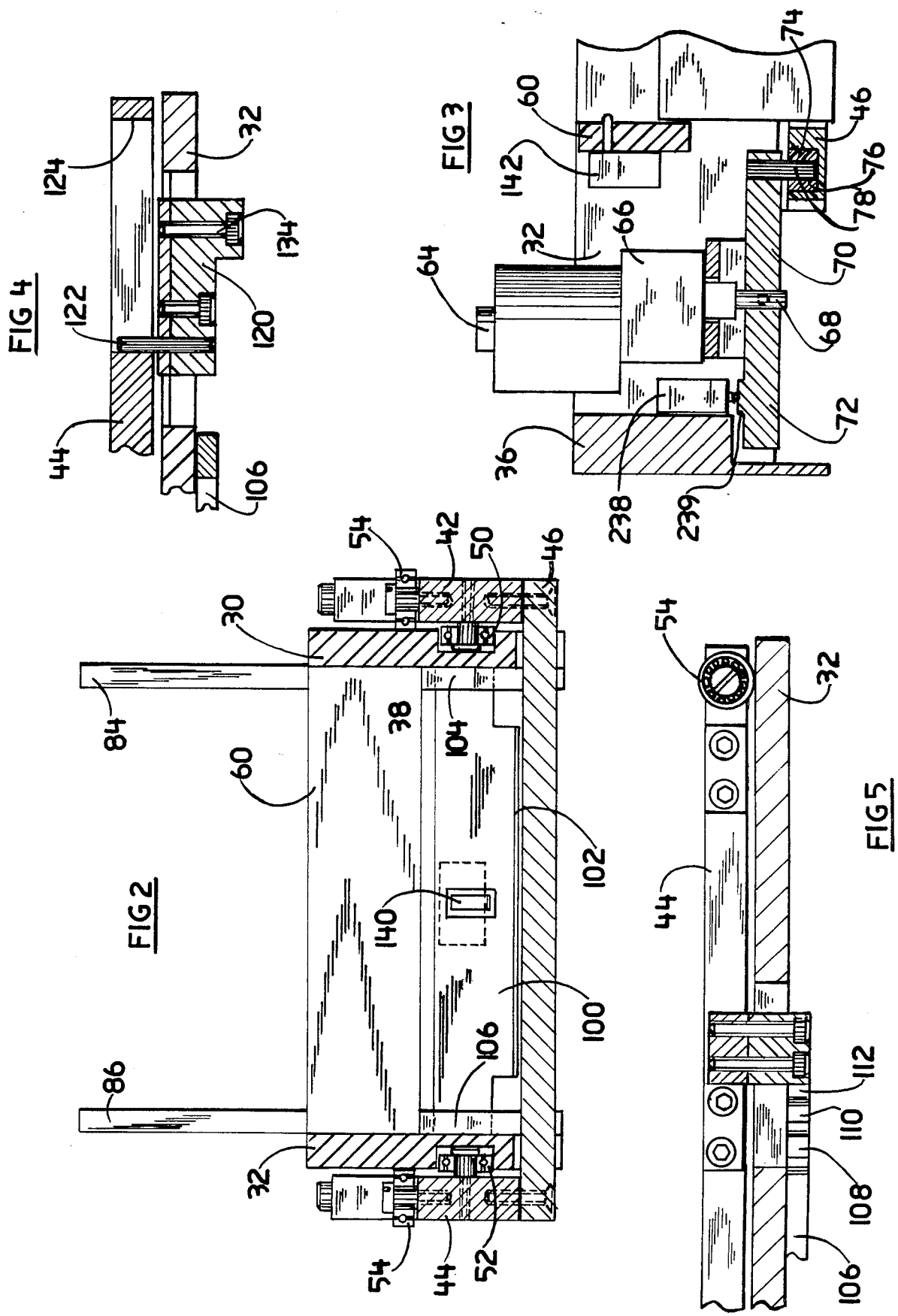

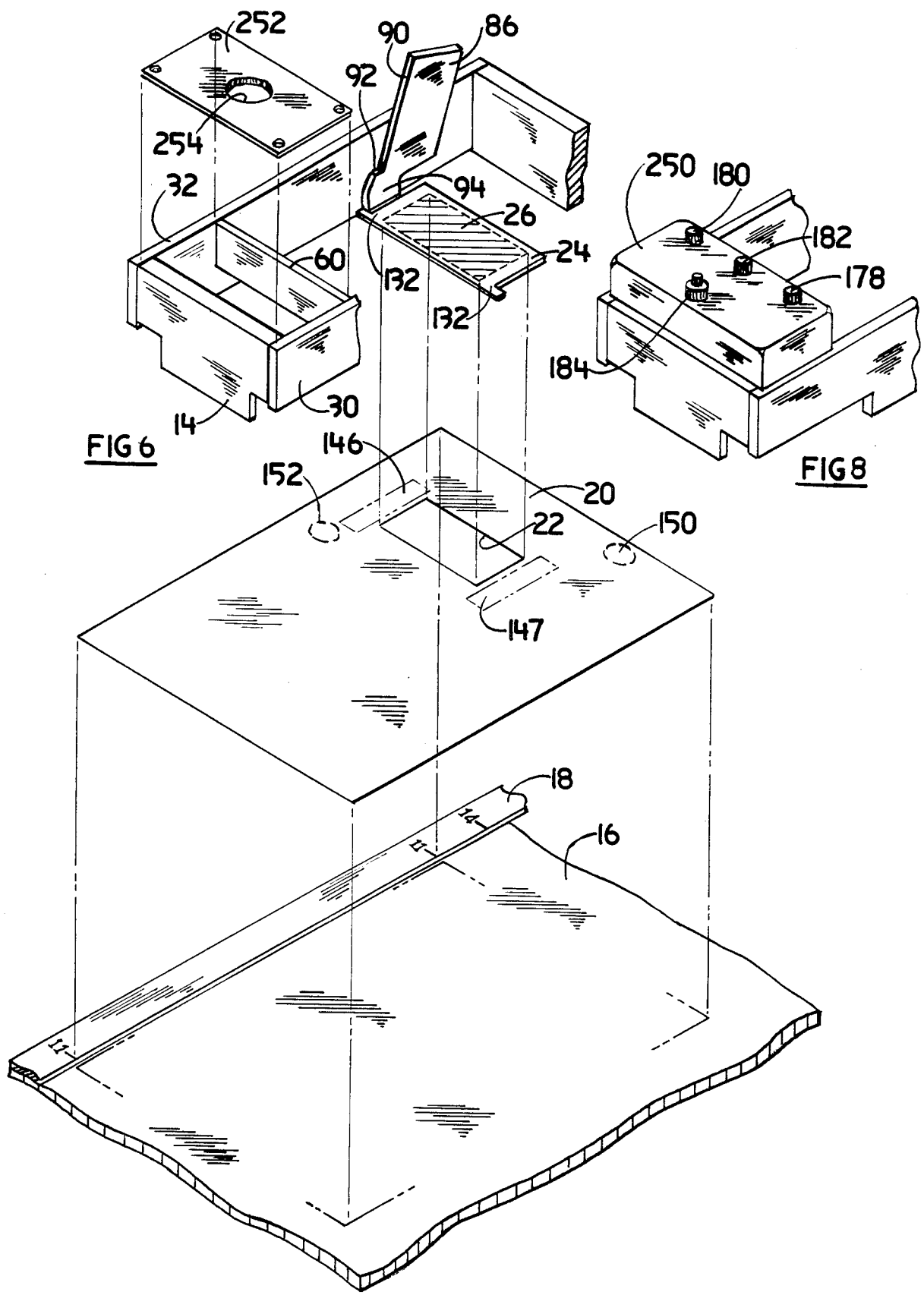

COPIER APPARATUS

The present invention pertains to copier apparatus. More particularly, it relates to apparatus usable with a typical office-type copying machine for the purpose of enabling that machine to reproduce a succession of letters or other information, each individually having respective differences therebetween.

The typical office copier features a machine on which a document to be copied is placed after which a button usually is depressed to actuate that machine. Through a photographic exposure process, the machine delivers a copy of the document that originally was placed on top. Sometimes, it is uneconomical to employ that approach for the purpose of sending copies of the very same information to a plurality of recipients each copy of which has to be individually addressed.

In various office systems, it often is necessary to handle a multiplicity of sheets or cards in a stack. Document feeding and stacking apparatus for that purpose is disclosed in U.S. Pat. No. 4,067,568-Irvine. Other successive-document handling apparatus includes U.S. Pat. Nos. 4,056,321-Gensike et al, 4,039,180-Stocker, 3,947,118-Amort, 3,692,304-de Ridder, 3,212,774-Ingalls, 3,642,370-Meredith et al and 3,661,453-McGuire et al.

The totality of those approaches represents a variety of ways for handling various problems associated with multiple addressing and/or problems associated with handling a plurality of sheets successively to be printed-out by some technique. Each and all of those references, however, exhibit undue complexity and, in most cases, lack of adaptation to an already existent copying machine. Some of those references are directed to the handling of what may be called address cards, but that is often done in an inconvenient and uneconomical manner.

It is, accordingly, a general object of the present invention to provide a new and improved copier apparatus that overcomes deficiencies in the prior art as mentioned herein above.

Another object of the present invention is to provide a most-simple apparatus of the kind described that can simply be set atop an existing office copier or the like.

A further object of the present invention is to adapt to the copying problem a method which involves a brand new approach, so as to enable simple exposure through a master to do the job.

In accordance with one aspect of the present invention, copier apparatus, designed for use with a machine that prepares the copy from an original placed atop a surface through which the original is exposed, includes means defining a master having a window through which a card placed over the window is exposed along with other matter carried upon the surface of the master. An assembly disposed above the master includes means for accepting a stack of cards individually carrying respective different notations to be exposed through the window. Included in that assembly is handling means for placing successive different ones of the cards in a position over the window and for correspondingly moving successive ones of the cards from the exposure position into a storage location.

Many new details of importance are included in the foregoing apparatus as described. In addition, another aspect of the invention pertains to a method of copying which boils down to the placing of a master atop a photographic copying machine, the master having a window therethrough. The master is exposed for copying while a notation is presented through the window, so as also to be copied along with the master. That permits individually different ones of such notations to be presented successively.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is an isometric view of a copier apparatus, including dash-lined representation of a component handled thereby in several different positions;

FIG. 2 is a cross-sectional view taken along the line 2—2 in FIG. 1 and deleting one or more components which otherwise might be shown in the background;

FIG. 3 is a cross-sectional fragmentary view taken along the line 3—3 in FIG. 1;

FIG. 4 is a fragmentary cross-sectional view taken along the line 4—4 in FIG. 1;

FIG. 5 is a fragmentary cross-sectional view taken along the line 5—5 in FIG. 1;

FIG. 6 is an exploded isometric view illustrating a relationship of different components, some of which are shown fragmentarily;

FIG. 8 is a fragmentary schematic and isometric view of an additional component mounting.

Figure 7:
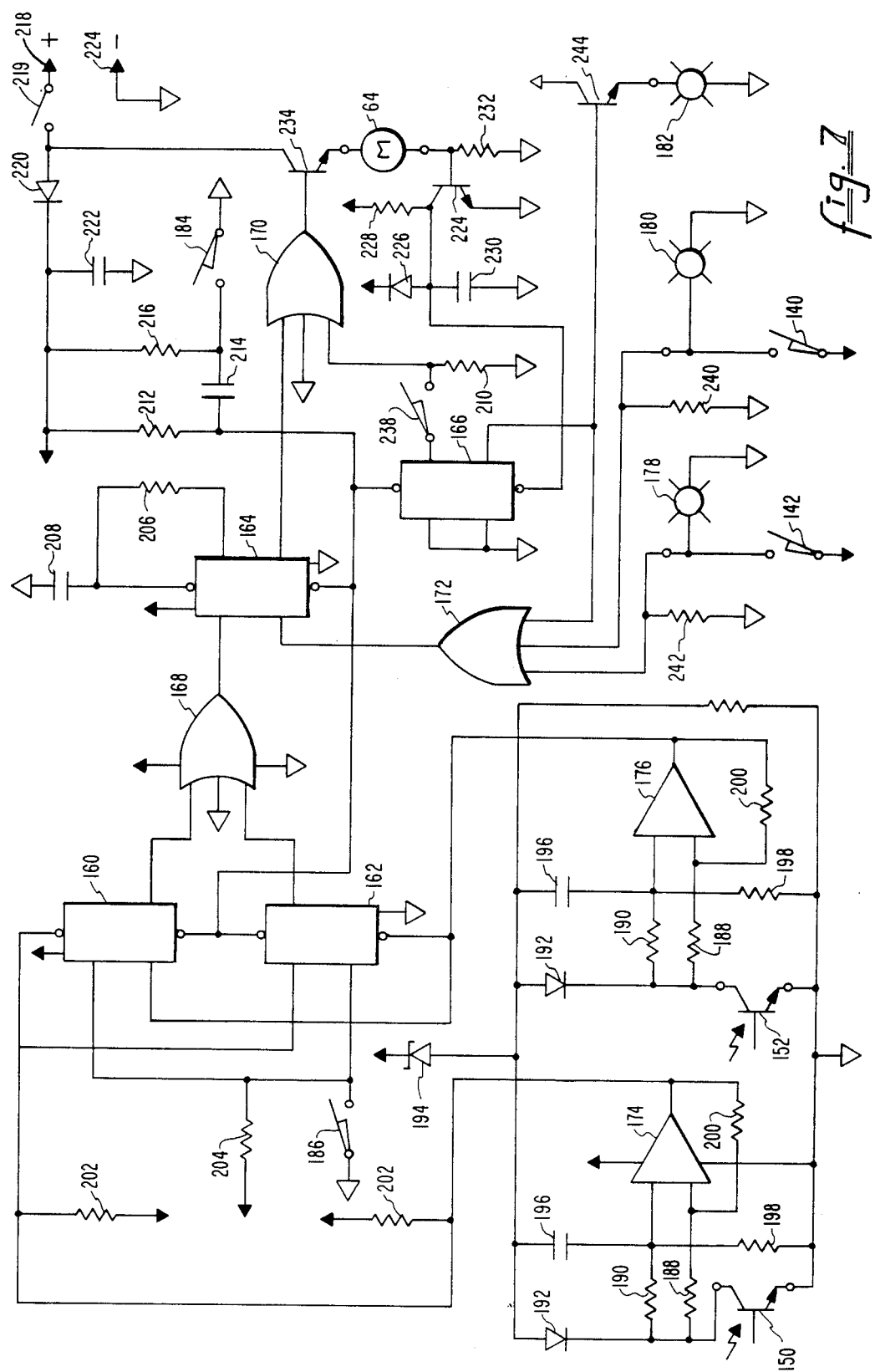
FIG. 7 is a schematic diagram of control circuitry for the apparatus of FIG. 1.

As shown in FIG. 1, copier apparatus 10 is in the form of an assembly which includes a carriage 12 mounted on a carrier 14 for accommodating movement of carriage 12 in a horizontal direction. Before getting into structural details, it will be of assistance to refer to FIG. 6 wherein the relationship of carrier 14 to other components is depicted.

A faceplate 16 is the portion of the transparent working surface of a conventional office-type copying machine. The original to be copied is placed on top of faceplate 16 with the matter to be printed facing downwardly so as to be exposed by a photographic technique and transferred to the surface of a sheet being fed through the machine below faceplate 16. The term "faceplate" is arbitrarily adopted herein. Some call it a "platen", but in a copier it is not the equivalent of a part which applies or accepts mechanical pressure. The article to be copied just rests on top and is exposed therethrough. Along at least one edge of faceplate 16 is a typical indicator strip 18 upon which dimensional representations permit the user to align the original in accordance with its longitudinal dimensions. A similar indicator strip often is included for lateral positioning. For present purposes, it does not appear to make any difference as to what kind of standard office copier is employed, provided that it is of a kind in which exposure is made through such a faceplate. The embodiment described herein in detail is suitable for use only with a copier that has a flat faceplate. However, the same concepts may be applied for adapting to a faceplate that is curved or otherwise configured.

Also shown in FIG. 6 is a mask or master 20 which in use is placed on faceplate 16 with the printing being on its underside as so placed. Without more, therefore, the sheet material of master 20 is no different from the ordinary letter or other document intended to be copied by the copying machine of which faceplate 16 forms a part. In this case, however, master 20 is provided at a suitable location with an aperture or window 22. Accordingly, matter printed on the underside of master 20 will be copied by the machine, while window 22, without more, would yield a "blank". Lines lightly printed on the back of the master can facilitate proper placement of the apparatus.

In operation of the present apparatus, carrier 14 functions to deposit a card 24 over window 22. On the underside of card 24 is an area 26 of printed matter. As a result, whatever printing appears in area 26 is copied by the copying machine in the same manner as is the printed matter on the underside of master 20. It has been found that, at least with master 20 being of no greater thickness than the usual sheet of paper being copied, there is no apparent difference in resolution in the ultimate copy by reason of the slight upward displacement of card 24 relative to the postion of master 20.

A primary purpose of apparatus 10 has been to permit the multiple copying of a form letter while individually addressing each copy to a different recipient. To that end, window 22 is located at the customary place on the letterhead corresponding to the initial address and, perhaps, the salutation. A corresponding plurality of cards 24 individually carry the addressee information, and those cards are changed successively in correspondence with the making of each successive copy. However, the utility is not limited to the addressing of form letters. Window 22 could be located anywhere on master 20 and the notation being copied through that window may be something entirely other than an address and salutation. For example, it could be a variation in information to be reported on each of successive ones of a plurality of documents which otherwise have associated material which is common to all of the copies. In any case, it is a primary function of carrier 14 to accept a stack of cards 24, deliver them one at a time to a position over window 22 and then deliver each card into a storage position in a manner that the integrity of their order of stacking is maintained.

In achievement of the foregoing ends, carrier 14 is composed of opposing sidewalls 30 and 32 bolted to space-opposed end walls 34 and 36. Formed into the outwardly-facing surfaces of sidewalls 30 and 32 are longitudinally-extending grooves 38. Carriage 12 is composed of a pair of space-opposed rails 42 and 44 spaced slightly outwardly from the corresponding ones of sidewalls 30 and 32 and tied together at opposing ends by laterally disposed bars 46 and 48.

Projecting into corresponding ones of grooves 38 and 40 near each end of rails 42 and 44 are respective roller bearings 50 and 52 individually supported by the resective ones of rails 42 and 44. Thus, carriage 12 is supported to move in a horizontal direction longitudinally on carrier 14. Near the opposite ends of each end of rails 42 and 44 are corresponding vertically-axled roller bearings 54 which increase the precision and stability of the relative movement and ensures that carrier 14 is not ridden against by either of rails 42 or 44. Other movable-support arrangements may be incorporated in order to reduce the total count of bearings required.

Spaced inwardly from end plate 36 is a cross wall 60 that completes definition of a drive compartment 62. Mounted within compartment 62 is an electric motor 64 coupled to a reduction-gearbox 66 from which downwardly projects a drive shaft 68. Secured on shaft 68 is a pitman arm 70 that continues in the other direction into a counterbalancing arm 72. Embedded centrally in bar 46 is an insert 74 of plastic or the like and in which is defined a laterally-extending slot 76. Rotation of shaft 68 oscillates a pin 78 on arm 70 back and forth in slot 76 so as, in turn, to cause reciprocation of carriage 12 back and forth longitudinally of carrier 14.

Within longer compartment 82, defined between cross wall 60 and end wall 34, is located card-handling apparatus. Basic thereto is a hopper defined in essence by space-opposed generally upright guide bars 84 and 86 disposed respectively against the inner surfaces of sidewalls 30 and 32 and which present corresponding guide rails 88 and 90 that slant upwardly but to the rear and in the direction of end plate 34. At the lower end of each of surfaces 88 and 90 is a step 92 from the outer end of which the guide bar continues as a finger 94 in a gentle curve to a point atop a shim 96 secured atop the partially open floor area 98 of compartment 82. Spanning the lower portion of guide bars 84 and 86 near end wall 34 is a cross member 100 which has a lip 102 that projects between guide bars 84 and 86 and slants in an upward direction to match the corresponding slant of steps 92.

Secured on inner sidewalls 30 and 32 of carrier 14 are cam plates 104 and 106. As can best be seen by the representation in FIG. 1, the upper corner portion of cam plate 106 includes a succession of gently merging steps 108 and 110 that terminate in a gently curving camming surface 112 the lower end of which is spaced from the facing lower end of finger 94 by a selected distance.

Mounted on beneath cross member 100 is a pusher 114 spaced atop a shim 116 at an elevation generally the same as that of shim 96. In this case, pusher 114 is a stub projecting laterally outward from bar 48. Spaced on each side thereof is one of a pair of launcher bars 120 that slide along respectively to the interiors of sidewalls 30 and 32 and are disposed to move beneath guide bars 84 and 86, respectively. Each of launcher bars 120 includes an outwardly projecting pin 122 that rides within a corresponding slot 124 formed through a respective one of side rails 42 and 44. Located above the space between each finger 94 and cam surface 112 are jogger bars 126 carried through slots 128, in each of sidewalls 30 and 32, by supports 130 fastened to the corresponding ones of rails 42 and 44.

Each of cards 24 has along a lower margin a pair of oppositely-directed ears 132. In use, a stack of such cards 24 are inserted between guide bars 84 and 86 so that the bottom card in the stack rests with its upper margin seated on lip 102 and its ears 132 seated on shelf 92 as indicated for what would be a bottom-most card 24a as shown in FIG. 1. In this condition, a stub 134 inwardly projecting from launching bar 120 is immediately behind the upper edge corner of the bottom card. Upon the energization of motor 64 and the beginning of movement of carriage 12 in the direction toward the lower left in FIG. 1, stub 134 catches the lowermost card and pushes it off of shelf 92 and lip 102 so that it falls into the position indicated at 24b in FIG. 1. Of course, that position is disposed over window 22 in sheet 20. Transfer is thereafter initiated by the control circuitry, yet to be described, the notation on card 24 in its area 26 is thereby transferred to the copy being made. Subsequently, continued movement of carriage 12 on carrier 14 permits pusher 114 to cam ears 132 upwardly along surface 112 and over steps 110 and 108 so as ultimately to cause the card to be rested in a storage position as indicated at 24c in FIG. 1. Jogger 126 functions to move the cards in their successive rising across steps 110 and 108 as the operation proceeds card by card. Preferably, each ear 132 is radiused top and bottom in order to facilitate the camming and ramping of cards 24. It may be noted that cards 24 probably are later stored with ears 132 lowermost.

Also preferably included is a switch 140, in this case disposed through cross member 100, that has a sensor arm located to inform the circuitry that the hopper has become nearly empty so that continued operation can be shut down or the hopper can be refilled (even during continued operation). That is, switch 140 provides a warning signal. Analogously, a switch 142 is mounted so that its sensing plunger or other detector communicates through cross wall 60 so as to determine when the storage area atop plates 106 and 104 has become about full, again in order to allow removing cards or shutting down operation and, in either event, preferably sounding an audible signal.

Shims 96 and 116 may be included so that the cards are always spaced very slightly above the surface of the underlying master sheet 20. This prevents an abrasive wearing down of that surface area by the movement of the cards over and away from their individual coverage of window 22. In what presently seems to be a preferred approach, shims 96 and 116 are deleted and strips 146 and 147 are secured to master 20 along the opposed lateral side margins of window 22. Strips 146 and 147 are lengths of thin plastic tape or the like adhesively affixed. Similarly, the entire back of the window area may be covered with a clear plastic film. In any case, such affixed plastic also serves to avoid a possible tendency of the window to catch in some typewriters.

Cards 24 may be constructed of any suitable material, such as any of a metal, plastic or mere cardboard. A straight cut of the sidewalls of window 22 will sometimes result in the formation of a line on the copy in correspondence with the definition of the window. It has been found that that line, at least with many copying machines, can be totally or at least substantially deleted by forming the edges of window 22 so as to be "fuzzy". The cards, in that case, are larger than window 22 and hold down those edges. In addition, such a fuzzy edge can be put on the card when its dimensions are smaller than the window. Some experiments to date have indicated that a suitable window 22 may be formed by use of a high pressure water jet to cut the window and yet leave the kind of fuzzy edge desired. Without doubt, other methods of cutting master sheet 20 to form a fuzzy window will be devised, and experimental windows that seem to be satisfactory have been formed with such crude techniques as tearing the paper of the master rather than cutting it with a sharp edge. One approach that appears favorable is to cover window 22 with a thin plastic which exhibits a graduated contrast density, becoming gradually darker as the margins of window 22 are approached. With different copying machines, however, it has been found that a razor-sharp window edge avoids reproduction of the window outline.

It will be noted that cards 24 could have other marginal configurations in order to allow their mounting and handling. The use of ears 132 presently seems to be the simplest way of ensuring that the cards stack well and are always aligned properly.

The printing in area 26 may be directly formed on the surfaces of cards 24. Advantageously, area 26 is at a level depressed into card 24, so that a typed or otherwise printed label is adhesively accepted in that depression. This approach tends to reduce smudging. Cards 24 are reusable when a substitute label is employed. In addition, each card 24 may support a tape or otherwise-formed area which is magnetized to carry a message useful in interfacing with an associated copy collator or with the coping operation itself in order to signal the number of copies to be made from each card or to provide other operational instruction.

In one alternative, pusher 114 is U-shaped, so that only the arms of the "U" engage the cards. Also, the facing margins of the cards may include a recess that facilitates cooperation with pusher 114 maintaining alignment of the cards which are being moved.

Using state of the art electronics, control of the aforedescribed apparatus not only is simple but can be accomplished in a number of different ways. The presently preferred approach is to mount the electronic components upon a printed circuit board disposed atop compartment 62 as indicated in FIG. 6. The necessary control switches are exposed to the user in an attractive panel mounted on the apparatus. Operation of the unit itself is controlled by a pair of photosensitive sensors seated in floor area 98 at locations indicated at 150 and 152 in FIG. 6.

Sensor 152 is located ahead of window 22, while sensor 150 is located behind window 22. Thus, they are aligned on approximately a diagonal relative to window 22. When both sensors have been activated, the machine cycle is enabled in order to advance the next card and store the last one. Refined circuitry can also allow the making of multiple copies from a single card by use of a suitable selection switch.

A suitable control circuit is illustrated in FIG. 7. Ground points are indicated by hollow triangles and, in this case, positive potential sources are indicated by solidified triangles. The circuitry includes flip-flops 160, 162, 164 and 166 together with OR gates 168, 170 and 172 as well as comparators 174 and 176. Switch 142 serves to illuminate a dial lamp 178 in order to inform the user that it is time to remove the cards from the storage position. Analogously, switch 140 causes illumination of a dial lamp 180 to inform the user that the hopper is empty. Associated audio alarm is optional. Another dial lamp 182 receives information from the circuitry to indicate that the sensing appears to be incorrect, so that the user ought to check that the successive cards are flowing properly and the card path is not obstructed.

In this case, sensors 150 and 152 are phototransistors directly disposed in floor area 98 as mentioned above. However, other photoelectric sensors could be used and in turn employed to drive equivalent transistors in the illustrated circuitry. As shown in FIG. 1, sensor 152 is located within a well formed in sidewall 32. Sensor 150 is similarly mounted in sidewall 30 in the vicinity of end wall 34.

Also included is a switch 184 that enables the user manually to advance the cards and a switch 186 that accommodates what may be called copy direction. That is, most, if not all, copying machines proceed to move copy in a given direction. Switch 186 allows apparatus 10 to be mounted on a given machine in either longitudinal orientation with regard to the direction of copying. That makes it convenient for the user to orient apparatus 10 for most appropriate physical access. Preferably, switch 186 is located internally, so as to be accessible only to service personnel.

As embodied, phototransistors 150 and 152 as actually used are operated as photodiodes, their bases being unconnected. The emitters of both phototransistors are connected to ground and the respective collectors are connected through resisters 188 and 190 to the respective inputs of comparators 174 and 176. Each collector is connected through a diode 192 and a Zener diode 194 to positive potential and a time-constant is established by means of a capacitor 196 extending from diode 194 to the negative input of comparator 174 and a continuation to ground through a resistor 198. The outputs of each of comparators 174 are bridged by a resistor 200 back to the positive input terminal. Moreover, the output of comparator 174 is fed to the "PS" terminal of flip-flop 160, while the output from from comparator 176 is similarly fed to the "clear" terminal of flip-flop 162. Both of those signal paths are returned to postive through high resistances as indicated at 202. The "D" inputs of both of flip-flops 160 and 162 also are returned to positive through high resistances 204 and those inputs also are connected to be grounded through switch 186. The other input of flip-flop 160 is cross-connected to the "clear" terminal of flip-flop 162, while the other input of flip-flop 162 is connected to the "PS" terminal of flip-flop 160. The $\overline{Q}$ output of flip-flop 160 and the Q output of flip-flop 162 are fed to the respective inputs of OR gate 168. The third input of OR gate 168 is, in this case, not used and simply grounded.

The output from gate 168 feeds the trigger input of flip-flop 164 the D input of which is connected to receive the output from gate 172. The Q output from flip-flop 164 is returned through a resistor 206 both in its "PS" terminal and also through a capacitor 208 to ground. The $\overline{Q}$ output, on the other hand, is connected to one of the inputs of OR gate 180 the other input of which is returned to ground through a resistor 210, the unused input of gate 170 again being grounded. The "clear" terminal of flip-flop 164 is connected to positive potential through a resistor 212 bridged by the combination of a capacitor 214 and a resistor 216 but with the junction between capacitor 214 and resistor 216 being connected through switch 184 to ground.

A positive potential for all is received from a terminal 218 through a switch 219 and through a diode 220 and filtered by a capacitor 222. The other receipt side is returned to ground.

The clear terminal of flip-flop 164 also is connected to the clear terminal of flip-flop 166, the normal inputs of which are both returned to ground. The "PS" terminal of flip-flop 166 is fed to the collector of a transistor 224 above a diode 226 connected to positive and shunted with a resistor 228 and a capacitor 230 returned to ground. The emitter of transistor 224 also is returned to ground, while its base, above a resistive shunt 232 to ground, feeds one side of motor 64. The other side of motor 64 is powered through the emitter of a Darlington transistor 234 which is fed from the output of gate 170. A motor limit switch 238 connects the $\overline{Q}$ output of flip-flop 166 to a lead between resistor 210 and the one input of gate 170. Switch 238 is operated by a cam 239 on arm 72 and, thus, senses cycle completion.

Completing the circuitry, switch 140 is connected above a ground-return resistor 240 to one input of gate 172 a second input terminal of which is connected above a ground-return resistor 242 back through switch 142. The third input of gate 172 is connected to the Q input of flip-flop 166 as well as to the base of a transistor 244 the collector of which is returned to postive and the emitter of which supplies current through lamp 182 back to ground.

Switch 184 and indicators 178, 180 and 182 project upwardly from a cover 250 that mounts atop compartment 62. Cover 250 is secured atop a circuit board 252 which includes an opening 254 for accepting the upper end of motor 64.

This discussion of the circuitry and its illustration in FIG. 7 is included only for the purpose of making a complete disclosure of one embodiment. It is to be understood that a wide variety of alternative circuitry could be employed. In terms of the main principles of operation, whatever circuitry is employed has to detect the operation of the copying machine below and then take action to cycle one of cards 24 just exposed toward the storage position while selecting the new card. In other words, that operation desirably is completely automatic, dependent upon the operation of the copying machine, and safely warning when the card hopper is empty, or the storage area is full or when the advancing mechanism is jammed.

Of course, it will be apparent that the circuitry of FIG. 7 or equivalent circuitry can be abandoned entirely. The whole operation can be accomplished by the provision of necessary manually-operated switches to enable an operator, standing thereby, to cycle apparatus 10 each time the underlying copying machine completes its cycle.

While a particular embodiment of the invention has been shown and described, it will be obvious to those skilled in the art that changes and modifications may be made without departing from the invention in its broader aspects. Therefore, the aim in the appended claims is to cover all such changes and modifications as fall within the true spirit and scope of that which is patentable.

We claim:

1. Copier apparatus for use with a machine that prepares a copy from an information-carrying master placed atop a surface through which said master is reproducingly exposed, said apparatus comprising:

an information-carrying master within which is defined a window through which a card placed over said window is reproducingly exposed along with other matter carried upon the surface of said master;

an assembly disposed above said master and including means for accepting a stack of cards individually carrying respective different notations to be reproducingly exposed through said window;

and handling means included in said assembly for placing successive different ones of said cards in a position over said window and for correspondingly moving successive ones of said cards from said position into a storage location.

2. Apparatus as defined in claim 1 in which said cards individually include a message-bearing area for enabling operational instruction.

3. Apparatus as defined in claim 1 in which said assembly includes:

a carrier mountable atop said surface;

and a carriage movably mounted on said carrier.

4. An apparatus as defined in claim 3 in which said carrier includes means for defining a hopper to receive said stack of cards; and in which said carrier and carriage together define means for individually delivering successive ones of said cards for said placing.

5. An apparatus as defined in claim 4 in which said delivering means includes means for camming said cards into location and for jogging said cards in aid of that delivery.

6. An apparatus as defined in claim 1 which further includes means for enabling said handling means to move said cards without rubbing against said master.

7. An apparatus as defined in claim 1 which includes means responsive to said exposure for controlling said handling means.

8. An apparatus as defined in claim 7 in which said responsive means detects both initiation and cessation of operation of said handling means.

9. An apparatus as defined in claim 1 in which said window includes means defining an insufficient delineation to enable substantial definition of the outline of said window upon said copy.

10. Apparatus as defined in claim 1 in which, in each of said cards, the said notation is depressed into a major surface of the said card.

11. Apparatus as defined in claim 1 which includes means responsive to said exposure for controlling said handling means, said responsive means including photo-sensitive means disposed in said assembly to receive directly through said master a portion of the light produced by said machine to effect the reproducing exposure of said card together with said master.

12. Apparatus as defined in claim 11 in which said photosensitive means includes a first sensor located ahead of the position of the card being copied and a second sensor located behind said position.

13. Apparatus as defined in claim 12 in which said first and second sensors individually are located at respective diagonally-opposite corners of said card being copied.

14. Apparatus as defined in claim 12 in which said first and second sensors are disposed within wells defined in said assembly, so as to face said master.

15. Apparatus as defined in claim 1 in which said assembly includes means defining said storage location in a position disposed above said surface.

16. Copier apparatus for use with a machine that prepares a copy from an information-carrying master placed atop a surface through which said master is reproducingly exposed, said apparatus comprising:

means defining an information-bearing master which is placed atop said surface and carries information to be reproducingly exposed along with a notation on the card which becomes associated with said master;

an assembly disposed above said master and including means for accepting a stack of cards individually carrying respective different notations to be reproduced along with said information;

handling means included in said assembly for placing successive different ones of said cards in a position associated with said master and for correspondingly moving successive ones of said cards into a storage location; and means responsive to the reproducing exposure of said master and one of said cards for controlling said handling means, said responsive means including photo-sensitive means having a first sensor located ahead of the position of the card being copied and a second sensor located behind said position.

17. An apparatus as defined in claim 16 in which said responsive means determines both initiation and cessation of operation of said handling means.

18. Apparatus as defined in claim 16 in which said assembly includes:

a carrier mountable atop said surface;

and a carriage movably mounted on said carrier.

19. Apparatus as defined in claim 18 in which said carrier includes means for defining a hopper to receive said stack of cards;

and in which said carrier and carriage together define means for individually delivering successive ones of said cards for said placing.

20. Apparatus as defined in claim 19 in which said delivering means includes means for camming said cards into location and for jogging said cards in aid of that delivery.

21. Apparatus as defined in claim 16 which further includes means for enabling said handling means to move said cards without rubbing against said master.

22. Apparatus as defined in claim 16 in which, in each of said cards, the notation is depressed into a major surface of said card.

23. Apparatus as defined in claim 16 in which said assembly includes means defining said storage location in a position disposed above said surface.

* * * * *